United States Patent Office 3,708,476
Patented Jan. 2, 1973

3,708,476
AZETIDINO-THIAZOLIDINEMETHANE CARBOXYLIC ACIDS AND PROCESS FOR THEIR MANUFACTURE
Robert Burns Woodward, 12 Oxford St.,
Cambridge, Mass. 02138
No Drawing. Continuation-in-part of abandoned application Ser. No. 573,866, Aug. 22, 1966. This application Dec. 4, 1969, Ser. No. 882,301
Claims priority, application Switzerland, Dec. 9, 1965, 16,928/65, 16,979/65; Jan. 13, 1966, 451/66
Int. Cl. C07d 99/24
U.S. Cl. 260—243 C                  16 Claims

ABSTRACT OF THE DISCLOSURE

Process which comprises reacting an $N_1$-unsubstituted 4,4-disubstituted 3-acyl-azetidino[3,2-d]thiazolidin-2-one compound with a diformylmethylene-methane carboxylic acid ester and splitting in a resulting 4,4-disubstituted 3-acyl-α-diformylmethyl-2-oxo-1 - azetidino[3,2 - d]thiazolidinemethane carboxylic acid ester the 5-membered and forming a new 6-membered sulfur-nitrogen ring upon treatment with an acidic reagent. The compounds of the process are intermediates in the synthesis of 7-amino-cephalosporanic acid compounds.

CROSS-REFERENCES TO RELATED APPLICATIONS

This is a continuation-in-part of application Ser. No. 573,866, filed Aug. 22, 1966 and now abandoned.

The present invention provides a methodological procedure for the manufacture of azetidino-thiazolidinemethane carboxylic acids, derivatives thereof, as well as of 7-amino-3-desacetyloxymethyl-3 - formyl - isocephalosporanic acid compounds resulting therefrom by ring closure, which was used for the production of valuable intermediates and especially in the first synthesis of synthetic 7-amino-cephalosporanic acid and its derivatives, and which lends itself particularly well to this particular synthesis.

7-amino-cephalosporanic acid corresponds to the following Formula XVI

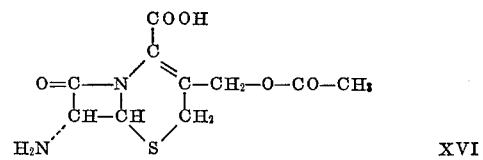

Derivatives are in the first place N-acyl compounds, in which the acyl radicals are especially those of pharmacologically active N-acyl derivatives of 7-amino-cephalosporanic acid such as the thienylacetyl, e.g. 2-thienylacetyl, cyanoacetyl, chloroethylcarbamyl or phenylacetyl radical, or readily eliminable acyl radicals, such as the residue of a carbonic acid semi-ester, for example, the tertiary butyloxycarbonyl residue.

The synthesis of this compound and of its derivatives, which are of importance to the manufacture of valuable medicaments, is based on the idea to use a 3,5-unsubstituted 2,2-disubstituted thiazolidine-4-carboxylic acid, for example, a compound of the formula

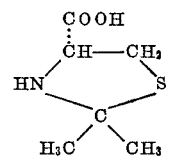

as the starting material and carry it out, for example, according to the following scheme of formulae:

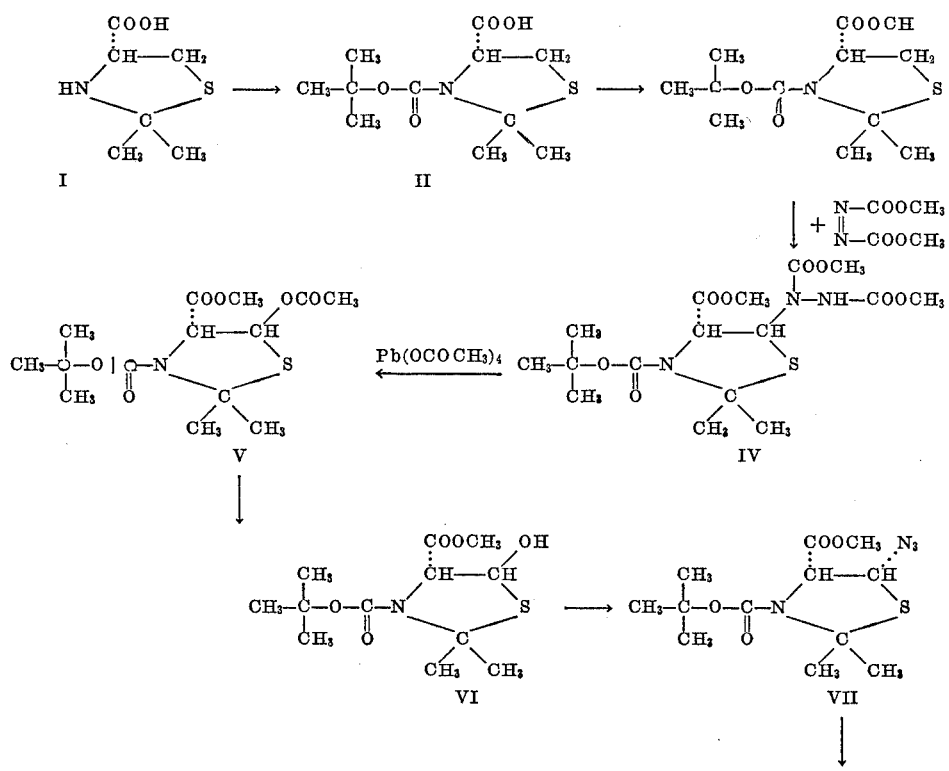

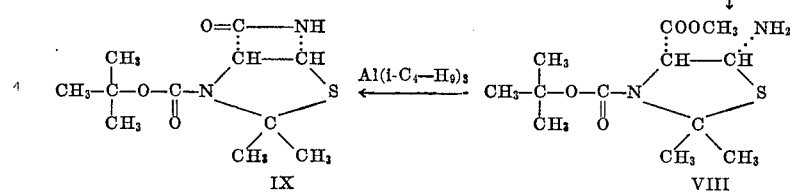

The compound IX is converted into the desired 7-aminocephalosporanic acid and its derivatives as follows:

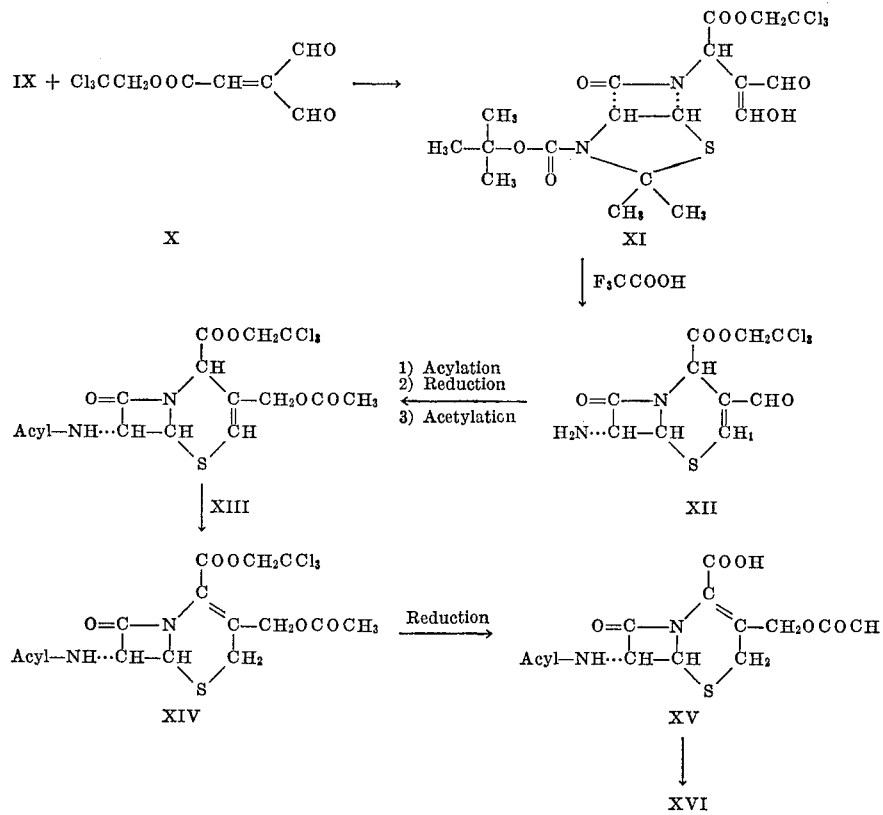

The above-mentioned intermediate compounds, for ex- is manufactured in the following manner:

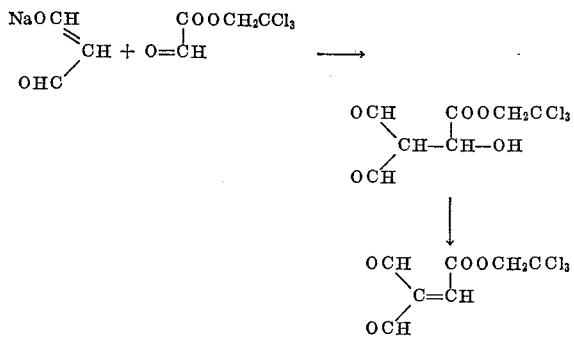

The above-mentioned intermediate compounds, for example the compounds of the Formulae XI and XII, are unexpectedly obtained, when an $N_1$-unsubstituted 4,4-disubstituted 3-acyl-azetidino[3,2-d]thiazolidin - 2 - one compound, such as a compound of the Formula IX, is reacted with a diformylmethylene-methane carboxylic acid ester, such as a compound of the Formula X, and, if desired, a resulting 4,4-disubstituted 3-acyl-α-diformylmethyl-2-oxo-1 - azetidino[3,2 - d]thiazolidinemethane carboxylic acid ester is reacted with an acidic agent while splitting the 5-membered and forming a new 6-membered sulfur-nitrogen ring, and, if desired, a substituent in a resulting compound is converted into another substituent, and, if desired, a resulting mixture of isomers is converted into the single isomers.

Substituents in 4-position are hydrocarbon residues, especially aliphatic hydrocarbon residues, such as lower alkyl, for example, ethyl, n-propyl, isopropyl or preferably methyl groups, or aromatic groups, especially phenyl groups, or araliphatic hydrocarbon residues, especially phenylalkyl, for example, benzyl or phenylethyl groups, as well as functionally converted, such as esterified carboxylic groups, for example, carbo-lower alkoxy, e.g. carbomethoxy or carbethoxy groups. The two substituents may also be joined and together represent a divalent hydrocarbon residue, especially a divalent aliphatic hydrocarbon residue, such as a lower alkylene, for example 1,4-butylene or 1,5-pentylene group, as well as a phthaloyl group, or an oxo or thiono group. The above-mentioned hydrocarbon residues are unsubstituted or may carry as substituents, for example, lower alkyl, such as methyl or ethyl groups, or lower alkoxy, such as methoxy or ethoxy groups, or halogen, such as fluorine, chlorine or bromine atoms, or halogenoalkyl, such as trifluoromethyl groups or other suitable groups.

Esters of diformylmethylene-methanecarboxylic acid are, for example, those with alcohols of any kind, especially aliphatic alcohols, such as alkanols, especially lower alkanols, for example, methanol, ethanol, n-propanol or tertiary butanol, or cycloaliphatic alcohols, such as cycloalkanols, for example, cyclohexanol, or araliphatic alcohols, such as phenylalkanols, for example, benzyl alcohol or diphenylmethanol; the above-mentioned alcohols may be unsubstituted or carry as substituents lower alkyl, lower alkoxy, nitro or trifluoromethyl groups or especially halogen atoms or other groups. Substituted hydroxy compounds esterifying the carboxylic acid are especially halogenated lower alkanols, such as 2,2,2-trichloroethanol.

The above reaction is carried out in such manner that the addition proceeds to a great extent without decomposition of the olefine, i.e. at room temperature or by heating the reaction mixture up to about 180° C., and preferably between about 50° C. and about 120° C., if desired, in the presence of a suitable diluent and/or condensing agent, and, if necessary, in an inert gas atmosphere and/or under superatmospheric pressure.

Acidic reagents used for the splitting of the 5-membered and the formation of the 6-membered sulphur-oxygen ring are inorganic or strong organic, oxygen-containing acids, as well as aprotic Lewis acids of the boron trifluoride type and the complexes thereof. Inorganic, oxygen-containing acids are, for example, sulfuric acid, phosphoric acid and perchloric acid, and strong organic, oxygen-containing acids or strong carboxylic acids are, for example, substituted lower alkane carboxylic acids, such as halogenated lower alkane carboxylic acids, for example, chloroacetic acid, trichloroacetic acid and especially trifluoroacetic acid, or strong organic sulfonic acids, for example, p-toluenesulfonic acid or p-bromobenzenesulfonic acid. Aprotic Lewis acids of the boron trifluoride type are, for example, boron trifluoride itself, as well as the complexes thereof, for example, with ether, that is to say, boron trifluoride etherate, or with hydrofluoric acid, that is to say, fluoboric acid, as well as tin tetrachloride. It is also possible to use suitable mixtures of acids.

The above ring-splitting and ring-closing reaction is carried out in the presence or absence of a suitable solvent (whereby certain acidic agents, for example, acetic acid or trifluoroacetic acid, can at the same time serve as solvents), with cooling, at room temperature or at an elevated temperature, if necessary, in a nitrogen atmosphere and/or in a closed vessel.

An acyl group in 3-position which is eliminable under acid conditions, such as the easily eliminable acyl residue of a semi-ester of carbonic acid, for example, a lower alkoxycarbonyl group, in which the alkyl portion is branched at the α-carbon atom, e.g. a tertiary butyloxycarbonyl or tertiary pentyloxy carbonyl radical, or is substituted at the α-carbon atom by aromatic groups, e.g. phenyl or biphenylyl, e.g. a carbobenzyloxy, carbo-α-4-biphenylyl-α-methyl-ethoxy or carbo-diphenylmethoxy group, or a carbo-adamantyloxy group, may also be split off or converted into a free carboxyl group, respectively under the reaction conditions.

Substituents in the compounds obtained can be converted according to various methods, some of them known ones, into other substitutents. Thus, a carboxy group esterified, for example, with a 2,2,2-trihalogeno-ethanol, especially 2,2,2-trichloroethanol, can be converted into the free carboxyl group by means of reducing agents. Suitable agents are chemical reducing agents, for example, nascent hydrogen, generated, for example by reacting metals, metal alloys or metal amalgams with hydrogen-furnishing agents, for example, zinc, zinc alloys, such as zinc-copper, or zinc amalgam in the presence of acids, for example, organic carboxylic acids, such as acetic acid, or alcohols, such as lower alkanols, alkali metal amalgams, such as sodium or potassium amalgam, or aluminum amalgam, in the presence of moist ether or lower alkanols, furthermore, alkali metals, such as lithium, sodium or potassium, or alkaline earth metals, such as calcium, in liquid ammonia, if necessary, with the addition of an alcohol, such as a lower alkanol. 2,2,2-trihalogenoethyl, particularly 2,2,2-trichloroethyl esters may also be converted into the free acids by treatment with reducing metal salts, such as chromium-II compounds, for example, chromium-II-chloride or chromium-II-acetate, preferably in the presence of aqueous media, containing water-miscible organic solvents such as lower alkanols, lower alkane carboxylic acids or ethers, for example, methanol, ethanol, acetic acid, tetrahydrofuran, dioxan, ethyleneglycol dimethylether or diethyleneglycol dimethylether.

Compounds having a free carboxy group can be converted, for example, into their salts, for example, alkali metal, alkaline earth metal or ammonium salts. Free carboxy groups can be esterified by methods in themselves known, for example, by treatment with a diazo compound, for example, a lower diazoalkane, such as diazomethane or diazoethane, as well as phenyl-lower diazoalkane such as phenyldiazomethane or diphenyldiazomethane, or, particularly those of resulting 7-amino-3-desacetyloxymethyl-3-formyl-isocephalosporanic acids, by reaction with a hydroxy compound suitable for esterification, such as an alcohol or an N-hydroxy-nitrogen compound, for example, a hydroxamic acid, in the presence of an esterification agent, such as a carbodiimide, for example, dicyclohexylcarbodiimide, as well as carbonyldiimidazole, or by any other known and suitable esterification process, for example, by reacting a salt or an acid with a reactive ester of the hydroxy compound, especially an alcohol, and a strong inorganic acid or a strong organic sulfonic acid. Furthermore, resulting activated esters, for example, esters with N-hydroxy-nitrogen compounds, or anhydrides formed with halogeno-formic acid esters can be converted into esters by reaction with other hydroxy compounds, for example, alcohols. Depending on the choice of the reaction, a formyl group present may be converted into an enol ether grouping.

In resulting compounds, a free amino group can be substituted by known methods, for example, it can be acylated by a treatment with acids or acid derivatives of carboxylic or sulfonic acids, for example, halides, for example, chlorides, anhydrides (including the inner anhydrides of carboxylic acids, i.e. ketenes, or of carbamic or thiocarbamic acids, i.e. isocyanates or isothiocyanates) or activated esters. If necessary, suitable condensing reagents, such as carbo-diimides, e.g. dicyclohexylcarbodiimide, are used.

Treatment of the process products with complex-forming heavy metal salts converts them, if desired, into their salts, for example the salts of copper, iron, magnesium, zinc or lead.

When the resulting products are treated with acylating agents, such as acid anhydrides or halides, possibly in the presence of a base such as pyridine, collidine or triethylamine, they may form enolacylates.

A resulting mixture of isomers can be resolved by a known method, for example by fractional crystallization, adsorption chromatography (column or thin-layer chromatography) or other methods into the component isomers. A resulting racemate can be resolved into the antipodes according to known methods, for example, by forming a mixture of diastereoisomeric salts with optically active salt-forming agents, breaking down the mixture into the diastereoisomeric salts and converting the isolated salts into the free compounds, or by fractional crystallization from an optically active solvent.

The invention includes also any modification of the process in which a compound obtained as intermediate is used as starting material and any remaining step or steps is or are carried out with it or the process is discontinued at any stage thereof, or wherein starting materials are used in the form of derivatives, for example salts, thereof or are formed during the reaction.

Preferably used starting materials and reaction conditions are those which give rise to the preferred process products specially mentioned above.

The starting materials used in the above process are prepared by the processes disclosed in patent applications Ser. No. 573,815 and Ser. No. 573,886, both filed Aug. 22, 1966.

In esters of 4,4-disubstituted 3-acyl-α-diformylmethyl-2-oxo-azetidino[3,2-d]thiazolidine-methanecarboxylic acids, as well as 7-amino-3-desacetyloxymethyl-3-formyl-isocephalosporanic acids prepared according to the present process the carboxyl groups are esterified with alcohols, such as those mentioned above. These compounds are especially those of the Formula XIa

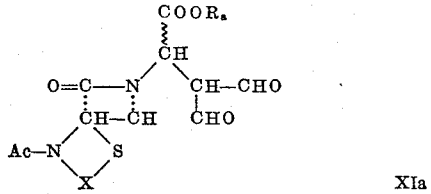

and their tautomers, as well as the compounds of the Formula XIIa

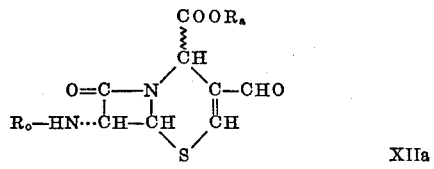

and/or their derivatives, in which Ac represents an acyl group, X is the disubstituted carbon atom of the thiazolidine ring, and $R_a$ stands for the residue of an alcohol, such as an unsubstituted or substituted aliphatic or araliphatic hydrocarbon residue, especially a lower alkyl or a halogeno-lower alkyl residue, for example, the 2,2,2-trichloroethyl residue, or a phenyl-lower alkyl radical and $R_o$ represents a hydrogen atom or an acyl group.

Acyl radicals Ac or acyl radicals representing $R_o$ are in the first place those which occur in pharmacologically active N-acyl derivatives of 7-amino-cephalosporanic acid, such as thienylacetyl, for example, the 2-thienylacetyl, chloroethylcarbamyl, cyanoacetyl, or phenylacetyl radicals, or readily eliminable acyl radicals, such as the residue of a carbonic acid semi-ester, for example, the tertiary butyloxycarbonyl residue, $R_o$ also representing a 5-amino-5-carboxy-valeryl residue, in which the amino and/or the carboxy group may be functionally protected, or any other suitable acyl residue, such as a benzoyl or substituted benzoyl residue.

The residue —X— represents above all the group of the formula

wherein $R_1$ and $R_2$ each represents one of the above-mentioned hydrocarbon residues, especially aliphatic, aromatic or araliphatic hydrocarbon residues or functionally converted carboxyl group, or wherein $R_1$ and $R_2$, taken together, may also represent a divalent hydrocarbon residue, as well as a phthaloyl residue or an oxo or thiono group.

As illustrated by the previous reaction scheme, the compounds of this invention can be all converted into 7-amino-cephalosporanic acid or its derivatives. This conversion may be carried out, for example, according to the process disclosed in patent application Ser. No. 573,876, filed Aug. 22, 1966.

The following examples illustrate the invention.

EXAMPLE 1

In two parallel batches a solution of 6 g. of 3,3-diformyl-lactic acid 2,2,2-trichloroethyl ester in 100 ml. of 1,2-dimethoxyethane is stirred dropwise into 400 ml. of gently boiling n-octane within 60 minutes and under an atmosphere of nitrogen, while simultaneously distilling off 240 ml. of solvent mixture through a distillation head. After cooling and while excluding moisture the reaction mixture is filtered and the filtrate, containing 3,3-diformyl-acrylic acid 2,2,2-trichloroethyl ester, is mixed with 1 g. of 3-tertiary butyloxycarbonyl-4,4-dimethyl-azetidino[3,2-d]thiazolidin-2-one. The reaction mixture is heated for 9 hours at 110° C. and then evaporated in a water-jet vacuum. The residue is extracted with 60 ml. of benzene.

The benzene extracts obtained from the two batches are combined and extracted with 5× 75 ml. of a saturated sodium hydrogen carbonate solution. The aqueous solutions are extracted once with benzene and the organic extracts are combined; they consist predominantly of polymeric starting material. The sodium hydrogen carbonate extracts are mixed with methylene chloride and acidified with citric acid to pH about 5, whereupon the organic phase furnishes the crude 3-tertiary butyloxycarbonyl-α-diformylmethyl - 4,4 - dimethyl - 2-oxo-1-azetidino[3,2-d] thiazolidine-acetic acid 2,2,2-trichloroethyl ester of the formula

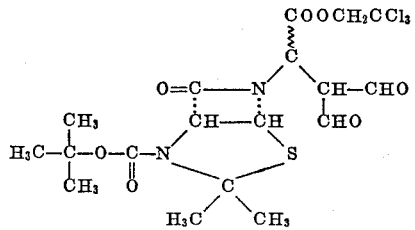

A total of 1.158 g. of the crude product are chromatographed on 45 g. of silica gel washed with acid. Fractional elution with benzene, containing 10% ethyl acetate yields at first the amorphous isomer B; infrared absorption bands (in methylene chloride) at 5.7μ, 5.8μ (broad), 5.85μ, 6.0μ, 6.12μ and 11.75μ (broad); which is followed by a mixture of the two isomers A and B, consisting substantially of the isomer A; with an 85:15-mixture of benzene and ethyl acetate, substantially pure isomer A, followed by pure, amorphous isomer A is eluted;

$[\alpha]_D = -122° \pm 2°$ (c.=0.460 in chloroform); infrared absorption bands (in methylene chloride) at 5.7μ, 5.8μ (broad), 5.9μ, 6.05μ, 6.25μ and 12.15μ (broad); which is completely washed out with a 75:25-mixture of the same solvents.

In the above procedure the 3-tertiary pentyloxycarbonyl-4,4-dimethyl-azetidino[3,2-d]thiazolidin-2 - one, 3-[2-(4-biphenylyl)-2-propyloxy]-carbonyl - 4,4 - dimethyl-azetidino[3,2 - d]thiazolidin - 2 - one or 3 - adamantyloxy carbonyl-4,4-dimethyl-azetidino[3,2-d]thiazolidin-2 - one can be used as starting materials instead of the 3-tertiary butyloxycarbonyl - 4,4 - dimethyl - azetidino[3,2-d]thiazolidin - 2 - one; one thus obtains the 3 - tertiary pentyloxycarbonyl - α - diformylmethyl - 4,4 - dimethyl - 2-oxo - 1 - azetidino[3,2 - d]thiazolidine - acetic acid 2,2,2 - trichloroethyl ester, 3 - [2 - (4 - biphenylyl) - 2-oxo-1-azetidino[3,2-d]thiazolidine - acetic acid 2,2,2-trichloroethyl ester and 3-adamantyloxycarbonyl-α-diformylmethyl - 4,4 - dimethyl - 2 - oxo - 1 - azetidino[3,2 - d] thiazolidine-acetic acid 2,2,2-trichloroethyl ester, respectively.

EXAMPLE 2

A mixture of 0.09 g. of 3-tertiary butyloxycarbonyl-4,4-dimethyl-azetidino[3,2-d]thiazolidin - 2 - one and 0.27 g. of crude 3,3-diformyl-acrylic acid 2,2,2-trichloroethyl ester in 10 ml. of xylene is heated for 10 hours at 110° C. and then evaporated. The residue is taken up in benzene, the organic solution is extracted three times with a saturated sodium hydrogen carbonate solution, and the combined aqueous solutions are acidified with citric acid and extracted three times with methylene chloride. After drying over anhydrous sodium sulfate, the organic extracts are evaporated and the resulting residue is chromatographed on silica gel washed with acid. The pure 3-tertiary butyloxycarbonyl-α-diformylmethyl-4,4-dimethyl-2 - oxo-1-azetidino[3,2-d]thiazolidine-acetic acid 2,2,2 - trichloroethyl ester is eluted as a mixture of the pure isomers A and B with mixtures of benzene and ethyl acetate as described in Example 1.

EXAMPLE 3

A solution of 6 g. of 3,3-diformyl-lactic acid 2,2,2-trichloroethyl ester in 100 ml. of 1,2-dimethoxyethane is stirred dropwise within 45 minutes under a weak current of nitrogen into 400 ml. of gently boiling n-octane (B.P. 125–129° C.), during which the bath temperature is adjusted so that 170 ml. of solvent can be distilled off simultaneously through a distillation head. When the addition is complete, another 20 ml. of solvent are distilled off and the mixture is cooled in ice. The batch is filtered and the clear, deep yellow filtrate, containing the 3,3-diformylacrylic acid 2,2,2-trichloroethyl ester, is mixed with 1.2 g. of 3-tertiary butyloxycarbonyl - 4,4 - dimethyl - azetidino-[3,2-d]thiazolidin-2-one, and the mixture is heated for 21 hours at 80° C., then allowed to cool and agitated with 75 ml. of a saturated sodium bicarbonate solution. After the two phases have been isolated, the resulting yellow resin is taken up in methylene chloride. The two organic solutions are extracted with 6× 75 ml. of a saturated sodium hydrogen carbonate solution. The alkaline aqueous extracts are washed once with 100 ml. of ether, then acidified with crystalline citric acid to pH about 3 to 4, and twice extracted with methylene chloride to yield the desired 3-tertiary butyloxycarbonyl-α-diformylmethyl-4,4-dimethyl-2-oxo-1-azetidino[3,2-d]thiazolidine - acetic acid 2,2,2-trichloroethyl ester. The crude product is distributed in 6 steps between 100 ml. of benzene and 100 ml. of phosphate buffer (pH=8.0) each, the buffer solution serving as the mobile phase and the benzene solution as the static phase. The products are obtained from the aqueous phases by acidification with crystalline citric acid, followed by extraction with methylene chloride. In the first three fractions by-products have accumulated, whereas the fractions obtained from the last three phases are once more distributed in 5 steps between benzene (each time 100 ml.) and phosphate buffer (pH about 5.6; each time 50 ml.). The bottom phase serves as mobile solution. The first 2 fractions yield the pure product (mixture of the isomers A and B), whereas the third fraction furnishes an impure product and the fourth and the fifth fractions yield by-products.

EXAMPLE 4

A mixture of 0.675 g. of 3-tertiary butloxycarbonyl-α-diformylmethyl-4,4-dimethyl-2-oxo - 1 - azetidino[3,2-d]thiazolidine-acetic acid 2,2,2-trichloroethyl ester (mixture of the A and B isomers) and 42 ml. of freshly distilled trifluoroacetic acid is stirred for 2½ hours at room temperature. The solvent is evaporated as completely as possible under reduced pressure and at room temperature. The residue is stirred for about 1 minute with 2 ml. of water and then with 10 ml. of methylene chloride and the organic mixture treated with a saturated aqueous sodium carbonate solution and a further 50 ml. of methylene chloride. The organic phase is washed with a further 10 ml. of a saturated aqueous sodium hydrogen carbonate solution, then with a saturated aqueous sodium chloride solution, dried over anhydrous sodium sulfate and then evaporated under reduced pressure without applying heat. This yields the 7-amino-3-desacetyloxymethyl-3-formyl-isocephalosporanic acid 2,2,2-trichloroethyl ester of the formula

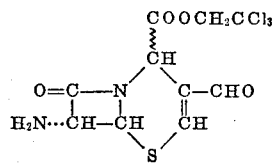

in the form of a mixture of isomers; infra-red absorption bands (in methylene chloride) at 5.6μ, 6μ and 6.35μ; ultraviolet absorption bands (in ethanol) $\lambda_{max}$ 292 mμ (ϵ=13,600); which is acylated without further purification.

The same mixture of isocephalosporanic acid derivatives is obtained when starting from pure isomer A or pure isomer B.

Upon treatment of the 3-tertiary pentyloxycarbonyl-α-diformylmethyl-4,4-dimethyl-2-oxo - 1 - azetidino[3,2-d] thiazolidine-acetic acid 2,2,2-trichloroethyl ester, 3-[2-(4-biphenylyl)-2-propyloxy]-carbonyl - α - diformylmethyl-4,4 - dimethyl -2 - oxo - 1 - azetidino[3,2 - d]thiazolidine-acetic acid 2,2,2-trichloroethyl ester or 3-adamantyloxycarbonyl - α - diformylmethyl - 4,4 - dimethyl - 2 - oxo-1-azetidino[3,2-d]thiazolidineacetic acid 2,2,2-trichloroethyl ester with trifluoroacetic acid according to the above procedure, the 7-amino - 3 - desacetyloxymethyl - 3 - formyl-isocephalosporanic acid 2,2,2-trichloroethyl ester is also obtained.

EXAMPLE 5

A total of 4 ml. of a solution containing 0.00626 g./ml. of pyridine in benzene, followed by 1.65 ml. of a solution of 2-thienylacetic acid chloride in benzene (containing 0.02173 g./ml. of the acid chloride) are added to a solution of 0.063 g. of crude 7-amino-3-desacetyloxymethyl-3-formyl-isocephalosporanic acid 2,2,2-trichloroethyl ester (prepared by ring closure of the pure isomer A of 3-tertiary butyloxycarbonyl-α-diformylmethyl-4,4-dimethyl-2-oxo-1-azetidino[3,2-d]thiazolidine-acetic acid 2,2,2-trichloroethyl ester) in 12 ml. of anhydrous benzene. After stirring for 16 hours, the solvent is evaporated as completely as possible, the residue is stirred with a saturated aqueous sodium hydrogen carbonate solution and extracted with methylene chloride. The organic extract (about 25 ml.) is washed with a saturated aqueous sodium chloride solution, dried and evaporated. The residue is chromatographed on 4 g. of silica gel washed with acid; 75 ml. of a 9:1 mixture of benzene and ethyl acetate yield the pure product C of 3-desacetyloxymethyl-3-formyl-7-(2-thienylacetylamino)isocephalosporanic acid 2,2,2-trichloroethyl ester, which corresponds to the formula

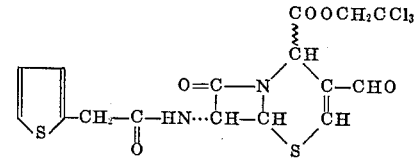

and crystallizes spontaneously in plates from a mixture of ether and methylene chloride; M.P. 155 to 157° C.; $[\alpha]_D = +342° \pm 11°$ (c.=0.091 in chloroform); infrared absorption bands (in methylene chloride) at 2.95μ, 5.675μ (broad), 6.025μ, 6.35μ and 6.7μ; ultra-violet absorption bands (in ethanol) at 238 mμ and 290.5 mμ.

A further amount of the almost pure product C is eluted with a further 40 ml. of the 9:1 mixture of benzene and ethyl acetate, and a mixture of the product C and a structural isomer D is eluted with a further 20 ml. of the same mixture; the almost pure structural isomer D of 3-desacetyloxymethyl - 3 - formyl-7-(2-thienyl-acetyl-amino)-isocephalosporanic acid 2,2,2-trichloroethyl ester is obtained with 25 ml. of a 4:1-mixture of benzene ethyl acetate; infrared absorption bands (in methylene chloride) at 5.65μ (weaker than in the case of product C), 6μ, 6.2μ (not present in the case of product C) and 6.35μ; ultra-violet absorption bands (in ethanol) $\lambda_{max}$. 239 mμ and 300 mμ.

EXAMPLE 6

A total of 0.16 ml. of anhydrous pyridine, followed by 7.7 ml. of a solution containing 0.0238 g./ml. of 2-thienyl-acetic acid chloride in benzene are added to a solution of 0.343 g. of 7-amino-3-desacetyloxy-methyl-3-formyl-isocephalosporanic acid 2,2,2-trichloroethyl ester (prepared by ring closure of the mixture of isomers A and B of 3-tertiary butyloxycarbonyl-α-diformylmethyl-4,4-dimethyl-2-oxo-1-azetidino[3,2-d]thiazolidineacetic acid 2,2,2-trichloroethyl ester) in 70 ml. of anhydrous benzene while stirring. The reaction mixture is stirred for 16 hours and the solid material, mainly pyridine hydrochloride, is filtered off. The filtrate is evaporated under reduced pressure, the residue is stirred with a saturated aqueous sodium hydrogen carbonate solution and extracted with 150 ml. of benzene. After washing with a saturated aqueous sodium hydrogen carbonate solution (twice) and with a saturated aqueous sodium chloride solution, the organic phase is dried and evaporated. The residue is chromatographed on 24 g. of silica gel washed with acid; elution with 450 ml. of a 9:1 mixture of benzene and ethyl acetate yields as a non-crystalline material the 3-desacetyloxymethyl-3-formyl-7-(2-thienylacetylamino)-isocephalosporanic acid 2,2,2-trichloroethyl ester (product C); elution with 150 ml. of the same mixture yields a mixture of the product C and the structural isomer D; elution with 100 ml. of the same mixture yields mainly structural isomer D; elution with 150 ml. of a 4:1 mixture of benzene and ethyl acetate yields the almost pure structural isomer D.

EXAMPLE 7

A total of 1 g. of freshly prepared moist chromium-(II)-acetate is added to 0.5 g. of 3-desacetyloxymethyl-3-formyl-7-(2-thienyl-acetylamino)-isocephalosporanic acid 2,2,2-trichloroethyl ester in a mixture of 10 ml. of acetic acid and 3 ml. of water, and the mixture is stirred for 3 hours at room temperature in a carbon dioxide atmosphere. After diluting with 100 ml. of ether and 80 ml. of water, the mixture is filtered, the aqueous phase is separated, extracted with ether, and the combined ether solutions are washed three times with 60 ml. of water each time. Evaporation of the dried ether solution yields the corresponding acid as crude product.

EXAMPLE 8

The solution (obtained by the method described below) of N - 2,2,2 - trichloroethoxycarbonyl-D-α-amino-adipic acid dichloride in methylene chloride is mixed, while cooling and stirring, in the course of 20 minutes with 0.065 gram of 7-amino-3-desacetyloxymethyl-3-formyl-isocephalosporanic acid 2,2,2-trichloroethyl ester in 2 ml. of methylene chloride and 0.015 ml. of pyridine. The reaction mixture is stirred at room temperature for 30 minutes, and then treated with a mixture of 2 ml. of methylene chloride, 0.014 ml. of pyridine and 0.025 ml. of 2,2,2-trichloroethanol. After standing for 16 hours, the reaction mixture is diluted with methylene chloride, the organic solution is washed with saturated sodium hydrogen carbonate solution and water, dried, and then evaporated to dryness. The crude product so obtained is chromatographed on 6 g. of purified silica gel. By means of 85:15- and 80:20-mixtures of benzene and ethyl acetate the isomeric 3-desacetyloxymethyl - 3 - formyl-6-[D-5-(carbo-2,2,2-trichloroethoxy)-5-(2,2,2 - trichloroethoxy-carbonyl-amino)-valerylamino]-isocephalosporanic acid 2,2,2-trichloroethyl ester of the formula

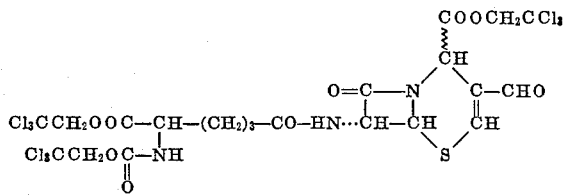

and 3-desacetyloxymethyl-3-formyl-7-[D-5-(carbo-2,2,2-trichloroethoxy) - 2 - (2,2,2 - trichloroethoxycarbonyl-amino)-valerylamino]-isocephalosporanic acid 2,2,2-trichloroethyl ester of the formula

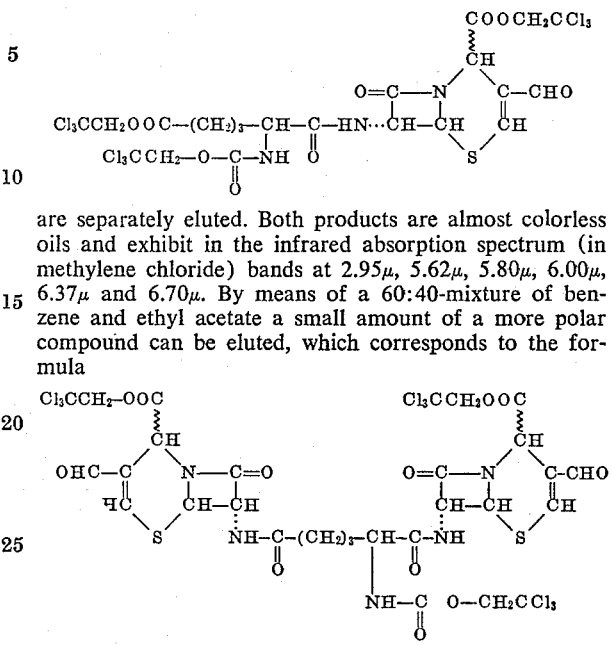

are separately eluted. Both products are almost colorless oils and exhibit in the infrared absorption spectrum (in methylene chloride) bands at $2.95\mu$, $5.62\mu$, $5.80\mu$, $6.00\mu$, $6.37\mu$ and $6.70\mu$. By means of a 60:40-mixture of benzene and ethyl acetate a small amount of a more polar compound can be eluted, which corresponds to the formula The starting material used in this example is prepared as follows:

194 ml. of 2,2,2-trichloroethanol are added at $-30°$ C. to 270 g. of liquid phosgene, without a reaction occurring. At the same temperature, the mixture is then diluted with 500 ml. of absolute tetrahydrofuran and then treated dropwise at $-40°$ C. with 162 ml. of pyridine, which causes an immediate precipitation of pyridine hydrochloride. Shortly before the last of the pyridine is added the reaction mixture heats up within 30 seconds from $-30$ to $+35°$ C.; the reaction is stopped by immersing the reaction vessel in a mixture of acetone and Dry Ice. The reaction mixture is then stirred for 1 hour under nitrogen while being cooled in the cooling mixture and then for 18 hours at room temperature. The colorless crystals are filtered off and washed with 1500 ml. of absolute ether, and the turbid organic solution is filtered through a layer of magnesium sulfate about 2 to 3 cm. thick, and then concentrated under diminished pressure and distilled, to yield the chlorocarbonic acid 2,2,2-trichloroethyl ester at 52 to 53° C. under a pressure of 9 to 10 mm. Hg.

To a well stirred solution of 1.51 g. of D-α-amino-adipic acid in 20 ml. of 2 N sodium hydroxide solution there are added first 4 g. of 2,2,2-trichloroethoxycarbonyl chloride and, after 40 minutes, a further 2 g. of the same reagent. After 20 minutes the pH of the solution is about 8; 5 ml. of a 2 N sodium hydroxide solution are then added, and, after 20 minutes, the mixture is extracted twice with portions of 50 ml. of ether each. The aqueous phase is acidified with 6 N hydrochloric acid, and then concentrated to a volume of about 50 ml. under reduced pressure produced by a water jet pump, whereby a part of the reaction product precipitates. The latter is extracted with ethyl acetate; after drying and evaporating the organic solution, the residue is triturated with methylene chloride and the liquid phase is removed by filtering with suction; the resulting N - 2,2,2 - trichloroethoxy-carbonyl-D-α-amino-adipic acid melts at 137.5° C. $[\alpha]_D^{20} = -8°$ (c.=1.03 in 1 N aqueous sodium hydroxide).

A suspension of 0.156 g. of phosphorus pentachloride in 1 ml. of absolute ether is mixed with 0.0845 g. of N-2,2,2-trichloroethoxycarbonyl-D-α-amino - adipic acid. The mixture is allowed to react for 15 minutes at room temperature, and is then evaporated to dryness. In this manner, there is obtained crude N-2,2,2-trichloroethoxycarbonyl-D-α-amino-adipic acid dichloride, which is dried under 0.01 mm. Hg and is dissolved in 2 ml. of methylene chloride.

EXAMPLE 9

A mixture of 0.0477 g. of 7-amino-3-desacetyloxymethyl-3-formyl-isocephalosporanic acid 2,2,2-trichloroethyl ester (Example 4) and 0.034 g. N-2,2,2-trichloroethoxycarbonyl-α-amino-adipic acid (Example 8) in 1 ml. tetrahydrofuran is treated with 0.021 g. dicyclohexylcarbodiimide. After 75 minutes, the N,N'-dicyclohexyl-urea is filtered off and washed with ether and methylene chloride; the filtrate is evaporated and the residue [absorption bands in the infrared absorption spectrum (in methylene chloride) at 2.95μ, 3.0μ, 5.65–5.8μ, 6.0μ, 6.20μ, 6.37μ, 6.68μ, 7.35μ, 8.3μ and 8.7μ], which contains the 3-desacetyloxymethyl-3-formyl-7-[D-5-carboxy - 5 - (2,2,2-trichloroethoxycarbonylamino) - valerylamino]-isocephalosporanic acid 2,2,2-trichloroethyl ester of the formula

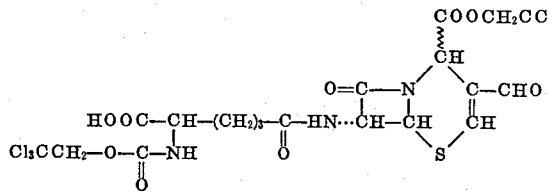

is taken up in 1 ml. methylene chloride and reacted with 0.038 g. of 2,2,2-trichloroethanol, 0.007 g. of pyridine and 0.0223 g. of dicyclohexylcarbodiimide. After standing for 18 hours, the methylene chloride is evaporated under reduced pressure and the residue is taken up in 2 ml. of benzene. The undissolved N,N'-dicyclohexyl-urea is filtered once more, combined with the washings and then concentrated under reduced pressure to a volume of 10 ml. The organic solution is washed with 10 ml. of a saturated aqueous sodium hydrogen carbonate solution, dried over sodium sulfate and evaporated under reduced pressure. The glasslike slightly yellow material is chromatographed on 8 g. of silica gel; the column is prepared in benzene and fractions of 10 ml. each are taken. The fractions eluted with 10 ml. of benzene, 40 ml. of a 9:1-mixture of benzene and ethyl acetate and 10 ml. of a 3:1-mixture of benzene and ethyl acetate are discarded; the fractions eluted with the following 30 ml. of the 3:1-mixture of benzene and ethyl acetate are combined; they contain the 3-desacetyloxymethyl-3-formyl-7-[D-5-(carboxy-2,2,2-trichloroethoxy) - 2 - (2,2,2-trichloroethoxycarbonyl-amino) - valerylamino] - isocephalosporanic acid 2,2,2-trichloroethyl ester. The following 10 ml. fraction with the same solvent mixture contains the mixture of the two structural isomers, whereas the eluates of the following 40 ml. of the 3:1-mixture of benzene and ethyl acetate are combined and taken up into a small amount of benzene. After filtering off an additional small amount of the N,N'-dicyclohexylurea, the benzene solution is evaporated; the residue furnishes the 3-desacetyloxymethyl-3-formyl - 7 - [D - 5 - (carbo-2,2,2-trichloroethoxy)-5-(2,2,2 - trichloroethoxycarbonyl-amino) - valerylamino] isocephalosporanic acid 2,2,2-trichloroethyl ester, which is used without further purification.

EXAMPLE 10

After standing for one month, 0.054 g. of the 3-desacetyloxymethyl-3-formyl-7-(2 - thienylacetylamino)-isocephalosporanic acid-2,2,2-trichloroethylester (Example 6; non-crystalline product C), is again, as shown in Example 6, chromatographed on 3 g. of silicagel and eluted with a 9:1-mixture of benzene and ethyl acetate. One thus obtains in crystalline form the isomer C 1 of the 3-desacetyloxymethyl - 3 - formyl-7-(2-thienylacetylamino)-isocephalosporanic acid 2,2,2-trichloroethyl ester, which crystallizes from a mixture of ether and methylenechloride, M.P. 133.5–135.5° C.; $[\alpha]_D^{20} = +440°$ (c.=0.1648 in chloroform). The infrared absorption spectrum (in methylene chloride) and the migrating distance in the thin layer chromatography (system: benzene and ethyl acetate 1:1) are identical with those of product C (Example 5).

EXAMPLE 11

A solution of 12 g. of 3,3-diformyl-lactic acid 2,2,2-trichloroethyl ester in 200 ml. of 1,2-dimethoxy-ethane is slowly added in the course of 30 minutes to 800 ml. of gently boiling octane. A slow current of anhydrous nitrogen is passed through the solution, and 200 ml. of the liquid distilled off during the addition, and 100 ml. after the addition. The yellow solution is then cooled and filtered, and the filtrate, which contains 3,3-diformyl-acrylic acid 2,2,2-trichloroethyl ester, is treated with 2 g. of 3-tertiary butyloxycarbonyl - 4,4 - dimethyl-azetidino-[3,2-d]thiazolidin-2-one, and stirred for 67½ hours.

The reaction mixture is concentrated to a volume of 300 ml. at 50° C. under a water-jet vacuum, then diluted with 200 ml. of ether. The solution is decanted and washed with 5× 100 ml. of saturated aqueous sodium bicarbonate. Each extract is separately washed with 150 ml. of pentane, the same organic solution being used for all aqueous extracts. The various aqueous phases are immediately stirred into 250 ml. of ice-cold methylene chloride, and the suspension acidified with solid citric acid. The succeeding sodium bicarbonate solutions are added to the same suspension and the latter acidified immediately with solid citric acid. The organic solution is separated, the acid phase is extracted twice with 200 ml. of methylene chloride each time, and the combined organic solutions are dried and evaporated to yield an "acid" product.

The ether-octane solution is combined with the pentane solution, dried and evaporated; a "neutral" product is obtained.

The rubber-like material obtained on decanting the ether-octane solution is dissolved in 250 ml. of methylene chloride and the solution extracted with 5× 100 ml. of a saturated sodium bicarbonate solution. Each of the five aqueous extracts is acidified with citric acid and worked up as aforedescribed to obtain the "acid" product. The methylene chloride solution is dried and yields another quantity of the "neutral" product. The combined "acid" material is chromatographed over 110 g. of silica gel previously washed with acid.

| Fraction | Solvent | Volume (in ml.) | Eluate (in g.) |
|---|---|---|---|
| 1–3 | Benzene:ethyl acetate (97:3) | 900 | 0.055 |
| 4–9 | Benzene:ethyl acetate (9:1) | 1,800 | 0.110 |
| 10–16 | do | 2,100 | 0.554 |
| 17–19 | do | 900 | 0.105 |
| 20–30 | do | 3,300 | 0.283 |
| 21–37 | Benzene:ethyl acetate (85:15) | 2,100 | 0.152 |

Fractions 10–16 (impure adduct B) are purified by countercurrent distribution over 13 steps using a pH 6.8-phosphate buffer, 40 ml. of a 1:1 mixture of benzene and ether being used as stationary phase, and 40 ml. of the buffer at each step. The aqueous phase is acidified at each stage with citric acid, extracted with methylene chloride, and the methylene chloride extract combined with the ether-benzene solution, and the whole dried and evaporated. From stages 6–12 the pure isomer B of 3-tertiary butyloxycarbonyl-α-diformylmethyl-4,4-dimethyl-2-oxo-1-azetidino[3,2-d]thiazoline-acetic acid 2,2,2-trichloroethyl ester is obtained; infrared absorption spectrum (in methylene chloride): bands at 3.2μ (broad), 3.5μ (broad), 5.65μ (shoulder), 5.7μ, 5.88μ, 6.02μ and 6.15μ; $[\alpha]_D = -188° \pm 1°$ (c.=0.72 in chloroform).

The A-isomer of 3-tertiary butyloxycarbonyl-α-diformylmethyl - 4,4 - dimethyl-2-oxo-1-azetidino[3,2-d]thiazolidine-acetic acid 2,2,2-trichloroethyl ester is obtained in pure state from fractions 30–37, and shows infrared-absorption bands (in methylene chloride) at 3.2μ (broad), 3.5μ (broad, 5.65μ (shoulder), 5.7μ, 5.9μ, 6.06μ and 6.25μ; [α]_D = −122°±2° (c.=0.46 in chloroform).

EXAMPLE 12

A mixture of 0.208 g. of the isomer B of 3-tertiary butyloxycarbonyl-α-diformylmethyl-4,4 - dimethyl-2-oxo-1-azetidino[3,2-d]thiazolidine-acetic acid 2,2,2-trichloroethyl esters of 12. ml. of trifluoroacetic acid is stirred for 2 hours and then concentrated without heating. The residue is stirred for 10 seconds with 4 ml. of water; 5 ml. of methylene chloride are added, followed by 8 ml. of a saturated sodium bicarbonate solution in water and another 40 ml. of methylene chloride. The aqueous portion is washed with another 40 ml. of methylene chloride, the combined organic solutions are washed with 15 ml. then with 20 ml. of a saturated sodium bicarbonate solution and 10 ml. of a saturated aqueous sodium chloride solution, dried over anhydrous sodium sulfate, and concentrated without heating. The residue is triturated with 3 ml. of hexane and dried. In this manner the isomer B 1 of 7-amino-3-desacetyloxymethyl-3-formyl-isocephalosporanic acid 2,2,2-trichloroethyl ester is obtained; UV absorption spectrum (in 95% ethanol): $\lambda_{max}$ 294 mμ; the product is processed immediately.

A solution of 0.104 g. of the above product in 10 ml. of dry benzene is treated, while being stirred, with 1.4 ml. of a solution of pyridine in benzene containing 0.03126 g. of the base/ml., followed by 2.4 ml. of a benzene solution containing 0.02168 g. of 2-thienylacetic acid chloride/ml. The batch is stirred for 16 hours, then filtered; the filtrate is concentrated to a volume of 2 ml. without heating and the residue treated with 10 ml. of a saturated sodium bicarbonate solution in water and with 30 ml. of benzene. The organic solution is washed with a saturated sodium bicarbonate solution and a saturated absorption spectrum in 95% ethanol): $\lambda_{max}$. 294 mμ; fate, and evaporated. The residue is crystallized from a mixture of methylene chloride and ether to yield the isomer C 1 of 3-desacetyloxymethyl-3-formyl-7-(2-thienylacetylamino)isocephalosporanic acid 2,2,2-trichloroethyl ester melting at 131–135° C.

The crystallization mother liquor is evaporated and the residue chromatographed on 1 g. of acid-washed silica gel:

| Fraction | Solvent | Volume (ml.) | Eluate (g.) |
| --- | --- | --- | --- |
| 1–3 | Benzene:ethyl acetate (95:5 and 9:1). | 20 | 0.002 |
| 4–7 | Benzene:ethyl acetate (9:1) | 40 | 0.017 |

Fractions 4–7 are recrystallized from a mixture of methylene chloride and ether, and yield another quantity of the isomer C 1 melting at 133–135° C. When recrystallized from a mixture of methylene chloride and ether, the product melts at 135–135.5° C.; [α]_D=+485°±1° (c.=1.137 in chloroform); infrared absorption spectrum (in methylene chloride) with bands at 2.95μ, 5.6μ, 5.65μ (shoulder), 6μ and 6.35μ.

EXAMPLE 13

A mixture of the isomer A of 3-tertiary butyloxycarbonyl - α - diformylmethyl-4,4-dimethyl-2-oxo-1-azetidino [3,2-d]triazolidine acetic acid 2,2,2-trichloroethyl ester (Example 11) and 10 ml. of trifluoroacetic acid is worked up as described in Example 12. The crude isomer A 1 of 7 - amino - 3 - desacetyloxymethyl-3-formyl-isocephalosporanic acid 2,2,2-trichloroethyl ester (UV absorption spectrum, in 95% ethanol, $\lambda_{max}$ 294 mμ) is dissolved in 15 ml. of benzene and treated with 0.04 ml. of pyridine, followed by 2 ml. of a benzene solution of 2-thiophene acetic acid chloride containing 0.01555 g. of the acid chloride per ml. The reaction mixture is worked up as described in Example 12 and the resulting product chromatographed on 3.5 g. of acid-washed silica gel:

| Fraction | Solvent | Volume (ml.) | Eluate (g.) |
| --- | --- | --- | --- |
| 1 | Benzene | 20 | |
| 2–5 | Benzene:ethyl acetate (95:5) | 60 | |
| 6–7 | Benzene:ethyl acetate (90:10) | 20 | 0.009 |
| 8–11 | do | 40 | 0.021 |

Fractions 8–11 crystalline from a mixture of methylene chloride and ether, and the resulting isomer C of 3-desacetyloxymethyl - 3 - formyl-7-(2-thienylacetylamino)-isocephalosporanic acid 2,2,2-trichloroethyl ester melts at 155–157° C.; [α]_D=317°±2° (c.=0.5965) in chloroform); infrared absorption spectrum (in methylene chloride) with bands at 2.88μ, 5.6μ, 5.65μ (shoulder), 5.98μ, and 6.35μ. The product is identical with the compound described in Example 5.

I claim:
1. A process for the manufacture of compounds of the formula

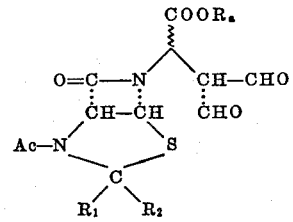

in which Ac is carboadamantyloxy or a lower alkoxycarbonyl group in which the alkyl portion is branched at the α-carbon atom or is substituted at the α-carbon atom by a mono- or bi-cyclic carbocyclic aromatic group, each of $R_1$ and $R_2$ is lower alkyl, and $R_a$ is a member selected from the group consisting of lower alkyl, halogeno-lower alkyl and phenyl-lower alkyl, which comprises reacting a compound of the formua

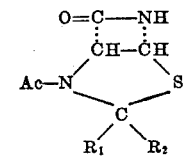

with a member selected from the group consisting of a compound of the formula

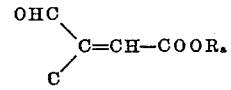

and a tautomer thereof.

2. A process as claimed in claim 1, wherein the addition is carried out at a temperature below 180° C.

3. A process as claimed in claim 2, wherein the addition is carried out at a temperature of 50 to 120° C.

4. A process for the manufacture of compounds of the formula

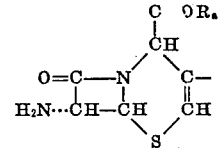

in which $R_a$ is a member selected from the group consisting of lower alkyl, halogeno-lower alkyl and phenyl-lower alkyl, wherein in a member selected from the group consisting of a compound of the formula

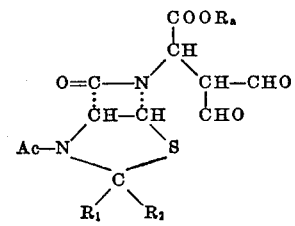

and a tautomer thereof, in which Ac is carboadamantyloxy or a lower alkoxy-carbonyl group in which the alkyl portion is branched at the α-carbon atom or is substituted at the α-carbon atom by a mono- or bi-cyclic carbocyclic aromatic group, and each of $R_1$ and $R_2$ is lower alkyl, the 5-membered sulfur-nitrogen ring is split and the new 6-membered sulfur-nitrogen ring is formed on treatment with a member selected from the group consisting of an oxygen-containing inorganic acid, a strong halogeno-lower alkane carboxylic acid, p-toluene sulfonic acid, p-bromobenzene sulfonic acid, boron trifluoride, boron trifluoride etherate and fluoboric acid, and tin tetrachloride.

5. A process as claimed in claim 4, wherein a member selected from the group consisting of sulfuric acid, phosphoric acid and perchloric acid is used.

6. A process as claimed in claim 4, wherein a halogeno-lower alkanecarboxylic acid is used.

7. A process as claimed in claim 4, wherein trifluoroacetic acid is used.

8. A process as claimed in claim 4, wherein p-toluene sulfonic acid is used.

9. A compound selected from the group consisting of a compound of the formula

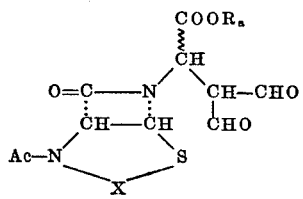

in which Ac is carboadamantyloxy or a lower alkoxy-carbonyl group in which the alkyl portion is branched at the α-carbon atom or is substituted at the α-carbon atom by a mono- or bi-cyclic carbocyclic aromatic group, X represents the group of the formula

in which the groups $R_1$ and $R_2$ are lower alkyl, and $R_a$ is a member selected from the group consisting of lower alkyl, halogeno-lower alkyl and phenyl-lower alkyl, and a tautomer of such compounds.

10. A compound as claimed in claim 9 and being a member selected from the group consisting of a compound of the formula

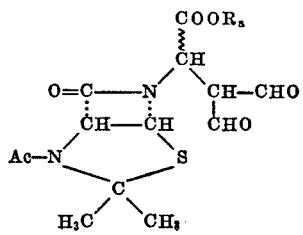

in which Ac is carboadamantyloxy or a lower alkoxy-carbonyl group in which the alkyl portion is branched at the α-carbon atom or is substituted at the α-carbon atom by a mono- or bi-cyclic carbocyclic aromatic group, and $R_a$ stands for a member selected from the group consisting of a lower alkyl, halogeno-lower alkyl and a phenyl-lower alkyl radical, and a tautomer thereof.

11. A compound as claimed in claim 9 and being a member selected from the group consisting of 3-tertiary butyloxycarbonyl - α-diformylmethyl-4,4-dimethyl-2-oxo-1-azetidino[3,2-d]thiazolidine acetic acid 2,2,2-trichloroethyl ester, and a tautomer thereof.

12. A compound of the formula

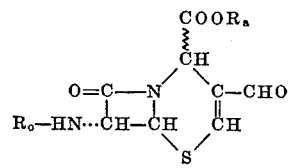

in which $R_o$ is a member selected from the group consisting of hydrogen, α-thienylacetyl, cyanoacetyl, chloroethylcarbamyl, phenylacetyl, 5-(carbo-2,2,2-trichloroethoxy)-5 - (2,2,2 - trichloroethoxycarbonylamino)-valeryl, 5-carboxy - 5 - (2,2,2-trichloroethoxycarbonyl-amino)-valeryl, carboadamantyloxy and a lower alkoxy-carbonyl group in which the alkyl portion is branched at the α-carbon atom or is substituted at the α-carbon atom by a mono- or bicyclic carbocyclic aromatic group, and $R_a$ represents a member selected from the group consisting of lower alkyl, halogeno-lower alkyl and phenyl-lower alkyl.

13. A compound as claimed in claim 12 and being the 7 - amino - 3-desacetyloxymethyl-3-formyl-isocephalosporanic acid 2,2,2-trichloroethyl ester.

14. A compound as claimed in claim 12 and being the 3 - desacetyloxymethyl - 3 - formyl - 7-(2-thienyl-acetylamino)-isocephalosporanic acid 2,2,2-trichloroethyl ester.

15. A compound as claimed in claim 12 and being the 3 - desacetyloxymethyl - 3 - formyl-7-[D-5-(carbo-2,2,2-trichloroethoxy) - 5 - (2,2,2 - trichloroethoxy-carbonylamino) - valerylamino]-isocephalosporanic acid 2,2,2-trichloroethyl ester.

16. A compound as claimed in claim 12 and being the 3 - desacetyloxymethyl - 3 - formyl-7-[D-5-carboxy-5-(2,2,2 - trichloroethoxy - carbonylamino)-valerylamino]-isocephalosporanic acid 2,2,2-trichloroethyl ester.

References Cited

UNITED STATES PATENTS

| | | | |
|---|---|---|---|
| 3,453,272 | 7/1969 | Takano et al. | 260—243 C |
| 3,481,948 | 12/1969 | Woodward | 260—243 C |
| 3,483,216 | 12/1969 | Woodward | 260—243 C |
| 3,498,996 | 3/1970 | Woodward | 260—243 C |
| 3,522,266 | 7/1970 | Woodward | 260—243 C |

NICHOLAS S. RIZZO, Primary Examiner

U.S. Cl. X.R.

424—246

PO-1050
(5/69)

UNITED STATES PATENT OFFICE
CERTIFICATE OF CORRECTION

Patent No. 3,708,476  Dated January 2, 1973

Inventor(s) ROBERT BURNS WOODWARD

It is certified that error appears in the above-identified patent and that said Letters Patent are hereby corrected as shown below:

Column 16, line 45 et seq. formula should read

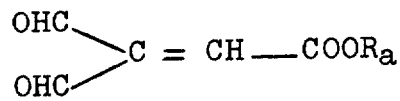

Column 16, between lines 56 and 62, formula should read

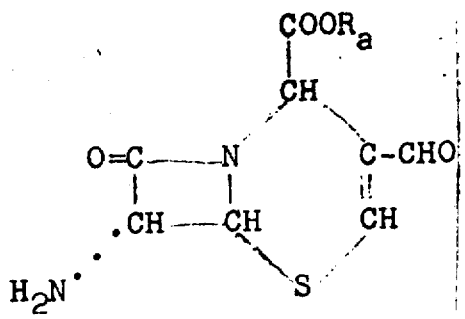

Signed and sealed this 16th day of July 1974.

(SEAL)
Attest:

McCOY M. GIBSON, JR.
Attesting Officer

C. MARSHALL DANN
Commissioner of Patents